(12) United States Patent
Miyauchi (10) Patent No.: US 12,444,222 B2
(45) Date of Patent: Oct. 14, 2025

(54) INFORMATION PROCESSING APPARATUS AND NON-TRANSITORY COMPUTER READABLE RECORDING MEDIUM RECORDING INFORMATION PROCESSING PROGRAM THAT GENERATE QUESTIONS ABOUT TARGET OBJECT SPECIFIED IN DOCUMENT

(71) Applicant: FUJIFILM Business Innovation Corp., Tokyo (JP)

(72) Inventor: Tadanobu Miyauchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 241 days.

(21) Appl. No.: 18/152,762

(22) Filed: Jan. 11, 2023

(65) Prior Publication Data
US 2023/0274567 A1     Aug. 31, 2023

(30) Foreign Application Priority Data
Feb. 28, 2022   (JP) .................... 2022-029679

(51) Int. Cl.
*G06F 40/289* (2020.01)
*G06V 30/18* (2022.01)
*G06V 30/19* (2022.01)

(52) U.S. Cl.
CPC .......... *G06V 30/1918* (2022.01); *G06V 30/18* (2022.01); *G06V 30/19093* (2022.01)

(58) Field of Classification Search
CPC .... G06F 40/131; G06F 40/137; G06F 40/143; G06F 40/279; G06F 40/284; G06F 40/289; G06F 40/56; G06V 40/56; G06V 30/18; G06V 30/19093; G06V 30/1918
USPC ........................................ 382/229
See application file for complete search history.

(56) References Cited

U.S. PATENT DOCUMENTS

| | | | |
|---|---|---|---|
| 6,763,906 B1 | 7/2004 | Moriyama et al. | |
| 2011/0099468 A1* | 4/2011 | Gaskill | G06F 16/93 715/240 |
| 2020/0092232 A1* | 3/2020 | Tojima | H04L 51/02 |
| 2022/0222286 A1* | 7/2022 | Tobita | G06Q 30/016 |

FOREIGN PATENT DOCUMENTS

| | | |
|---|---|---|
| JP | 2000190865 | 7/2000 |
| JP | 2020071690 | 5/2020 |
| JP | 2020077091 | 5/2020 |
| JP | 2020190865 | 11/2020 |

\* cited by examiner

*Primary Examiner* — Chad Dickerson
(74) *Attorney, Agent, or Firm* — JCIPRNET (57) ABSTRACT

An information processing apparatus includes a processor, the processor extracting, from at least a part of a document, a feature of the part, extracting related elements which are elements related to the feature from a question and an answer about a first target object stored in a storage unit using the extracted feature, and combining the extracted related elements and the feature to generate a question about a second target object specified in the document.

9 Claims, 8 Drawing Sheets

| ANCILLARY WORD | ABSTRACTION DEGREE |
|---|---|
| "GA" | 1 |
| "O/NI KAN SITE/NI KAN SITE NO" | 1 |
| "NI/E/ENO" | 1 |
| "NA" | 1 |
| "NO" | 3 |
| "SURU/SITA/SARERU/SARETA" | 5 |

GROUP 1
SIMILARITY 0.97

| | | |
|---|---|---|
| 1-1: BUNSHO NO SĀBISU Ē ENO APPURŌDO | FORMAL NAME+"NO"+"ENO" | 1+3+1=5 |
| 1-2: BUNSHO O SĀBISU BĪ NI APPURŌDO | FORMAL NAME+"O"+"NI" | 1+1+1=3 |
| 1-3: SA BĪ NI BUNSHO O APPURŌDO | ABBREVIATION+"NI"+"O" | 3+1+1=5 |
| 1-4: SA SĪ E DOKYUMENTO O APPURŌDO | ABBREVIATION+"E"+"O" | 3+1+1=5 |

GROUP 1
SIMILARITY 0.97

1-1: BUNSHO NO SĀBISU Ē ENO APPURŌDO
("UPLOAD DOCUMENT TO SERVICE A" IN ENGLISH)

1-2: BUNSHO O SĀBISU BĪ NI APPURŌDO
("UPLOAD DOCUMENT TO SERVICE B" IN ENGLISH)

1-3: SA BĪ NI BUNSHO O APPURŌDO
("UPLOAD DOCUMENT TO SERV. B" IN ENGLISH)

1-4: SA SĪ E DOKYUMENTO O APPURŌDO
("UPLOAD DOCUMENT TO SERV. C" IN ENGLISH)

GROUP 2
SIMILARITY 0.84

2-1: SĀBISU DĪ E DOKYUMENTO O AGERU HOUHOU
("METHOD OF UPLOADING DOCUMENT TO SERVICE D" IN ENGLISH)

2-2: SĀBISU BĪ ENO DOKYUMENTO NO AGEKATA
("WAY TO UPLOAD DOCUMENT TO SERVICE B" IN ENGLISH)

2-3: BUNSHO O SĀBISU DĪ NI AGERU HOUHOU
("METHOD OF UPLOADING DOCUMENT TO SERVICE D" IN ENGLISH)

2-4: DOKYUMENTO NO KURAUDO ENO AGEKATA
("WAY TO UPLOAD DOCUMENT TO CLOUD" IN ENGLISH)

| EXISTING MERCHANDISE EXPRESSION | ABSTRACTION DEGREE |
|---|---|
| FORMAL NAME | 1 |
| ABBREVIATION | 3 |

FIG. 4B

| ANCILLARY WORD | ABSTRACTION DEGREE |
|---|---|
| "GA" | 1 |
| "O/NI KAN SITE/NI KAN SITE NO" | 1 |
| "NI/E/ENO" | 1 |
| "NA" | 1 |
| "NO" | 3 |
| "SURU/SITA/SARERU/SARETA" | 5 |

FIG. 5

GROUP 1
SIMILARITY 0.97

| | |
|---|---|
| 1-1: BUNSHO NO SĀBISU Ē ENO APPURŌDO | FORMAL NAME+"NO"+"ENO" | 1+3+1=5 |
| 1-2: BUNSHO O SĀBISU BĪ NI APPURŌDO | FORMAL NAME+"O"+"NI" | 1+1+1=3 |
| 1-3: SA BĪ NI BUNSHO O APPURŌDO | ABBREVIATION+"NI"+"O" | 3+1+1=5 |
| 1-4: SA SĪ E DOKYUMENTO O APPURŌDO | ABBREVIATION+"E"+"O" | 3+1+1=5 |

FIG. 6

COMPOSITE ELEMENT
(RELATED ELEMENT 1-2)

BUNSHO O SĀBISU BĪ NI APPURŌDO

⇒

BUNSHO O SĀBISU EKKUSU NI APPURŌDO

QUESTION ABOUT
NEW MERCHANDISE

GROUP 1

| | |
|---|---|
| 1-1: BUNSHO NO SĀBISU Ē ENO APPURŌDO | ABSTRACTION DEGREE "5" |
| 1-2: BUNSHO O SĀBISU BĪ NI APPURŌDO | ABSTRACTION DEGREE "3" |
| 1-3: SA BĪ NI BUNSHO O APPURŌDO | ABSTRACTION DEGREE "5" |
| 1-4: SA SĪ E DOKYUMENTO O APPURŌDO | ABSTRACTION DEGREE "5" |

COMPOSITE ELEMENT (RELATED ELEMENT 1-2): BUNSHO O SĀBISU BĪ NI APPURŌDO

COMPLEMENTARY ELEMENT

C-1: BUNSHO O DORAGGU ANDO DORROPU DE APPURŌDO DEKI MASEN ("DOCUMENT CANNOT BE UPLOADED BY DRAG & DROP" IN ENGLISH)

C-2: SĀBISU BĪ JOU NO BETU NO FORUDA O SANSHOU SURU TOREI E BUNSHO O DORAGGU ANDO DOROPPU SITE IDOU SURU BAAI NO CYUUITEN O OSIETE KUDASAI ("TEACH ME PRECAUTIONS WHEN MOVING DOCUMENT TO TRAY REFER TO ANOTHER FOLDER ON SERVICE B BY DRAG & DROP" IN ENGLISH)

C-3: DORAGGU ANDO DOROPPU DENO APPURŌDO GA TOCYUU DE SYUURYOU SITE IMASU ("UPLOADING BY DRAG & DROP WILL END HALFWAY" IN ENGLISH)

C-4: DORAGGU ANDO DOROPPU NI YORU BUNSHO NO APPURŌDO DE APPURŌDO CYUU NI DAIAROGU NO KYANSERU BOTAN O OSITE MO TOUROKU SARETE SIMAU KOTO GA ARI MASU ("IN UPLOADING DOCUMENT BY DRAG & DROP, DOCUMENT IS SOMETIMES REGISTERED EVEN WHEN CANCEL BUTTON IN DIALOG IS PRESSED DURING UPLOADING" IN ENGLISH)

| | |
|---|---|
| COMPLEMENTARY EXPRESSION 1 | DORAGGU ANDO DOROPPU DE APPURŌDO ("UPLOAD BY DRAG & DROP" IN ENGLISH) |
| COMPLEMENTARY EXPRESSION 2 | BUNSHO O DORAGGU ANDO DOROPPU ("DRAG & DROP DOCUMENT" IN ENGLISH) |

FIG. 9

INFORMATION PROCESSING APPARATUS AND NON-TRANSITORY COMPUTER READABLE RECORDING MEDIUM RECORDING INFORMATION PROCESSING PROGRAM THAT GENERATE QUESTIONS ABOUT TARGET OBJECT SPECIFIED IN DOCUMENT

CROSS-REFERENCE TO RELATED APPLICATIONS

This application is based on and claims priority under 35 USC 119 from Japanese Patent Application No. 2022-029679 filed Feb. 28, 2022.

BACKGROUND

(i) Technical Field

The present invention relates to an information processing apparatus and a non-transitory computer readable recording medium recording information processing program.

(ii) Related Art

JP2020-190865A discloses a support system that efficiently provides answers to questions.

Conventionally, from the viewpoint of improving user's satisfaction level and reducing operator's burden, questions and answers about merchandise such as articles and services, that is, Q&A is presented to a user.

Much of the work for generating Q&A has been performed manually. For example, when Q&A for new merchandise is generated, arbitrary portions as questions are manually extracted from an instruction manual which is a document for explaining the new merchandise. As described above, when questions for new merchandise are generated, human work is involved, and there is room for improvement in terms of reducing the labor of the creator.

SUMMARY

Therefore, aspects of non-limiting embodiments of the present disclosure relate to an information processing apparatus that generates questions about a target object specified by a document without human intervention by utilizing elements included in accumulated past questions and answers.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus includes a processor. The processor extracts, from at least a part of a document, a feature of the part, extracts related elements which are elements related to the feature from a question and an answer about a first target object stored in a storage unit using the extracted feature, and combines the extracted related elements and the feature to generate a question about a second target object specified in the document.

DETAILED DESCRIPTION

An information processing apparatus 50 according to the present embodiment will be described below.

First Embodiment

The information processing apparatus 50 according to the first embodiment will be described first below.

Figure 1:
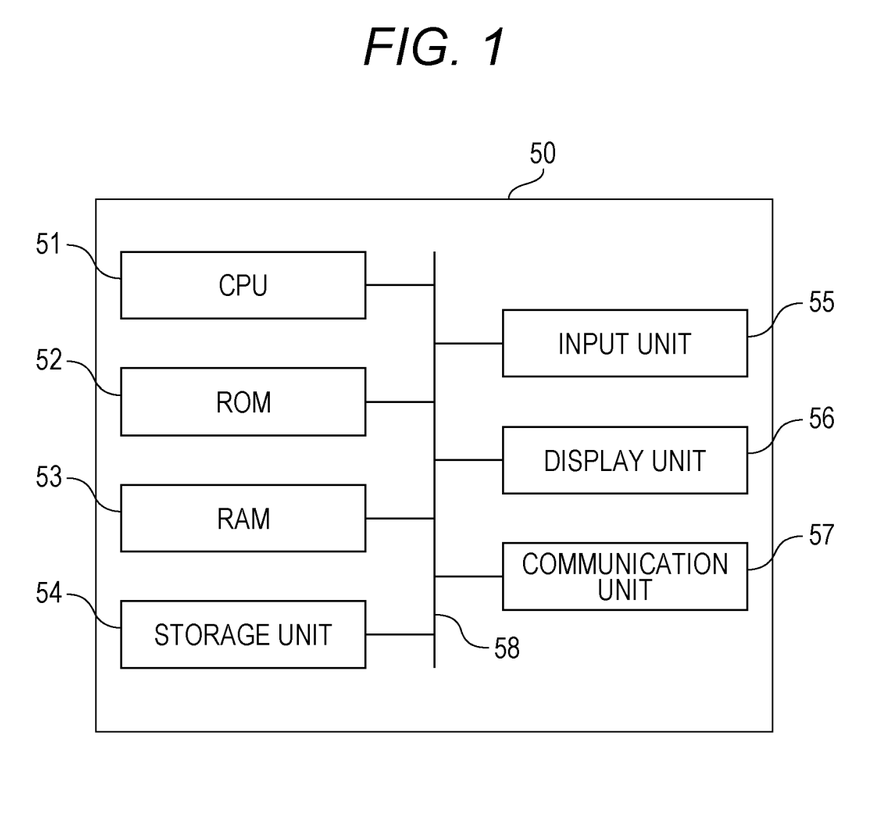
FIG. 1 is a block diagram illustrating the hardware configuration of an information processing apparatus.

FIG. 1 is a block diagram illustrating the hardware configuration of the information processing apparatus 50. A general-purpose computer apparatus such as a server computer or a personal computer (PC) is applied to the information processing apparatus 50. In the first embodiment, as an example, the information processing apparatus 50 is a server computer owned by a predetermined business operator.

As illustrated in FIG. 1, the information processing apparatus 50 includes a central processing unit (CPU) 51, a read only memory (ROM) 52, a random access memory (RAM) 53, a storage unit 54, an input unit 55, a display unit 56, and a communication unit 57. The respective components are communicably connected to each other via a bus 58.

The CPU 51 is a central processing unit and executes various programs or controls each unit. That is, the CPU 51 reads out programs from the ROM 52 or the storage unit 54 and executes the programs using the RAM 53 as a work area. The CPU 51 controls the above-described components and performs various kinds of arithmetic processing according to the programs stored in the ROM 52 or the storage unit 54. The ROM 52 or the storage unit 54 stores an information processing program for executing at least generation processing to be described later. Note that the information processing program may be installed in the information processing apparatus 50 in advance, may be stored in a nonvolatile storage medium, or may be distributed via a network and appropriately installed in the information processing apparatus 50. As an example of the nonvolatile storage medium, a CD-ROM, a magneto-optical disk, a hard disk drive (HDD), a DVD-ROM, a flash memory, a memory card, or the like is assumed. The CPU 51 is an example of a "processor".

The ROM 52 stores various programs and various data. The RAM 53 temporarily stores programs or data as a work area.

The storage unit 54 includes a storage device such as a hard disk drive (HDD), a solid state drive (SSD), or a flash memory and stores various programs and various data. The storage unit 54 stores questions and answers (Q&A) about existing merchandise. The storage unit 54 is an example of a "storage unit", Q&A is an example of "questions and answers", and the existing merchandise is an example of a "first target object".

The input unit 55 includes a pointing device such as a mouse, a keyboard, a microphone, and a camera and is used to perform various types of inputs operations.

The display unit 56 is, for example, a liquid crystal display and displays various types of information. The display unit 56 may employ a touch panel system and function as the input unit 55.

The communication unit 57 is an interface for communicating with another device. For the communication, for example, a wired communication standard such as Ethernet (registered trademark) or FDDI or a wireless communication standard such as 4G, 5G, or Wi-Fi (registered trademark) is used.

When executing the information processing program, the information processing apparatus 50 executes processing based on the information processing program using the hardware resources.

Figure 2:
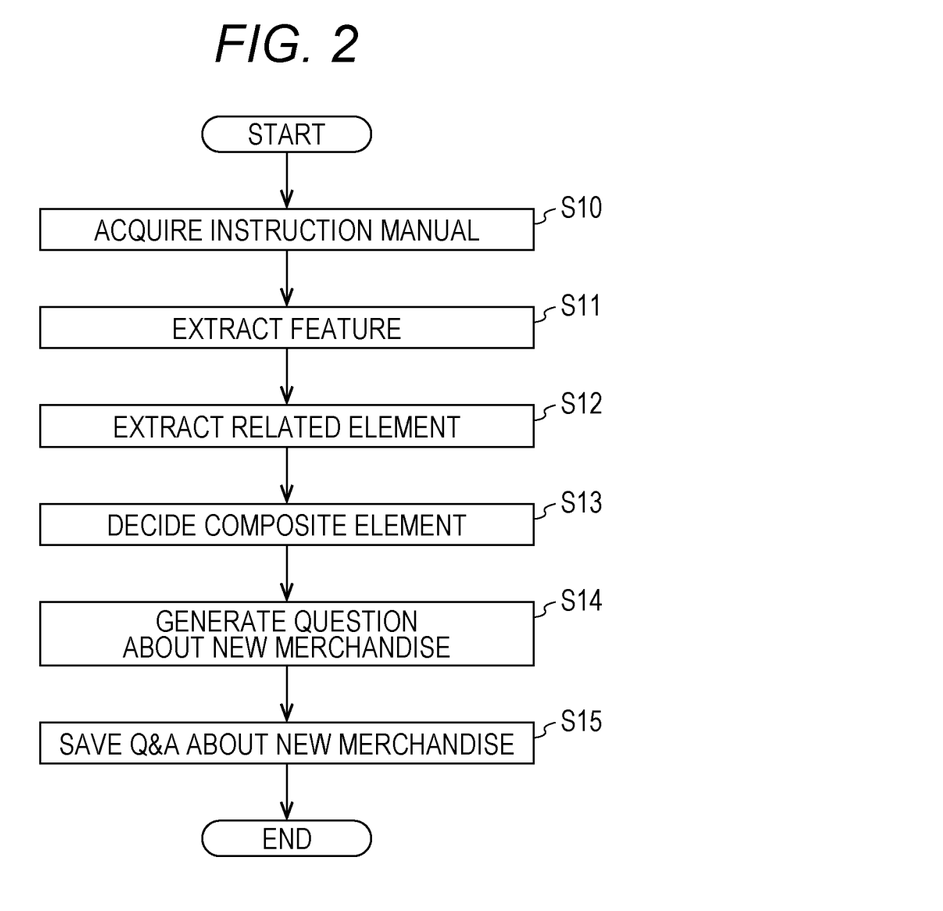
FIG. 2 is a first flowchart illustrating the procedure of generation processing by the information processing apparatus.

FIG. 2 is a first flowchart illustrating the procedure of generation processing of generating a question about new merchandise related to existing merchandise by the information processing apparatus 50. The CPU 51 reads out an information processing program from the ROM 52 or the storage unit 54, expands the information processing program in the RAM 53, and executes the information processing program, thereby performing generation processing. As an example, the new merchandise is merchandise of the same type as the existing merchandise or merchandise obtained by improving the existing merchandise. The new merchandise is an example of a "second target object".

In step S10 shown in FIG. 2, the CPU 51 acquires an instruction manual for the new merchandise. Then, the process proceeds to step S11. As an example, the instruction manual is stored in the storage unit 54. In step S10, the CPU 51 is not limited to acquiring the instruction manual stored in the storage unit 54 and may download and acquire the instruction manual via a network. The instruction manual is an example of a "document".

In step S11, the CPU 51 extracts features of the instruction manual from the instruction manual acquired in step S10. Then, the process proceeds to step S12. In this case, the instruction manual is a structured document described in a markup language. As an example, the instruction manual is composed of "chapter", "section", and "subsection". The "subsection" of the instruction manual describes information as an answer to a question about the new merchandise generated in the generation processing.

The CPU 51 reads the texts of the "chapter", "section", and "subsection" of the instruction manual one sentence at a time, performs morphological analysis, and divides the texts into words. The CPU 51 then extracts new merchandise expression, an operation expression indicating an operation executable with the new merchandise, and a target expression indicating a target of the operation as features from the result of the morphological analysis according to a predetermined extraction rule. The new merchandise expression is, for example, an expression capable of specifying new merchandise such as a formal name or an abbreviation of the new merchandise. The operation expression includes, as an example, an expression indicating an operation such as uploading or downloading. The target expression includes an expression indicating a target of the operation such as a document. As an example, the CPU 51 extracts the words "s ābisu ekkusu" (Romaji in Japanese; "service X" in English) which is the formal name of the new merchandise as a new merchandise expression, "appurōdo" (Romaji in Japanese; "upload" in English) as an operation expression, and "bunsho" (Romaji in Japanese; "document" in English) as a target expression. Any known technology can be adopted as a method of extracting features from the instruction manual by the CPU 51. The new merchandise expression is an example of a "specific expression capable of specifying the second target object".

In step S12, the CPU 51 uses the features extracted in step S11 to extract a plurality of related elements that are elements related to the features from the Q&A about the existing merchandise stored in the storage unit 54. The process then proceeds to step S13. A related element is a question sentence or an answer sentence in which an expression related to a feature included in the Q&A about the existing merchandise is described. Any known technology can be adopted as a method of extracting related elements by the CPU 51.

Figure 3:
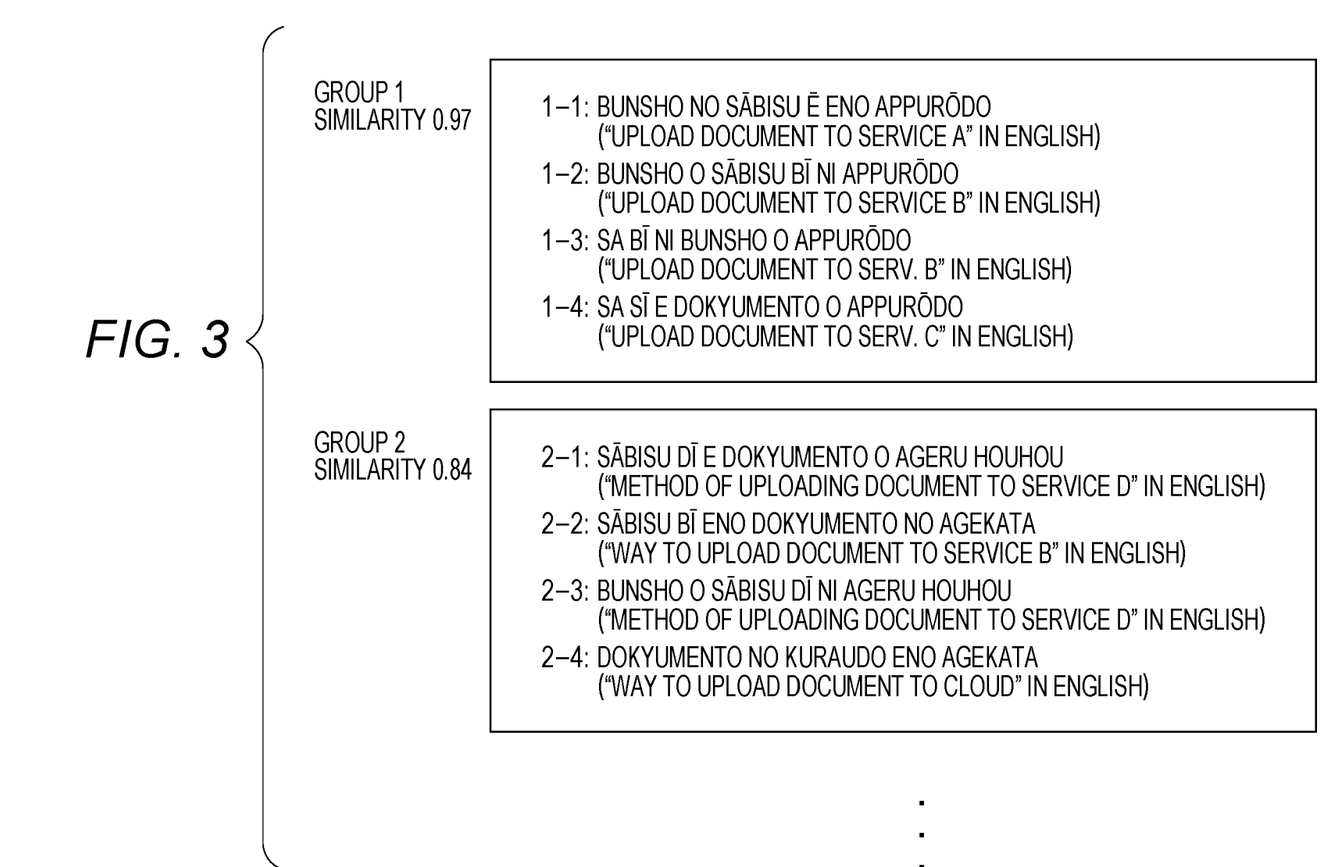
FIG. 3 is an explanatory diagram illustrating an example of related elements.

An example of the related elements extracted in step S12 will be described below. FIG. 3 is an explanatory diagram illustrating an example of related elements.

In step S12 illustrated in FIG. 2, the CPU 51 extracts a plurality of related elements such as related elements 1-1 to 1-4 and related elements 2-1 to 2-4 illustrated in FIG. 3. In step S12, the CPU 51 also extracts related elements other than the related elements 1-1 to 1-4 and the related elements 2-1 to 2-4, which are not illustrated in FIG. 3.

In addition, the CPU 51 ranks the similarity between each of the plurality of related elements and the feature extracted in step S11. As an example, the CPU 51 determines a similarity according to the degree of matching between a word included in the feature and a word included in a related element. Then, as illustrated in FIG. 3, the CPU 51 groups a plurality of related elements having a common similarity and arranges the groups in descending order of similarity.

Returning to FIG. 2, in step S13, the CPU 51 decides a composite element to be combined with the feature extracted in step S11 from the plurality of related elements extracted in step S12. The process then proceeds to step S14.

Figure 4A:
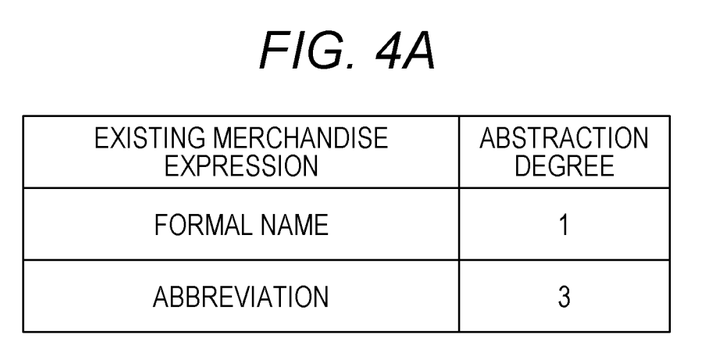
FIGS. 4A and 4B are a first explanatory diagram illustrating a method of deciding a composite element.
Figure 4B:
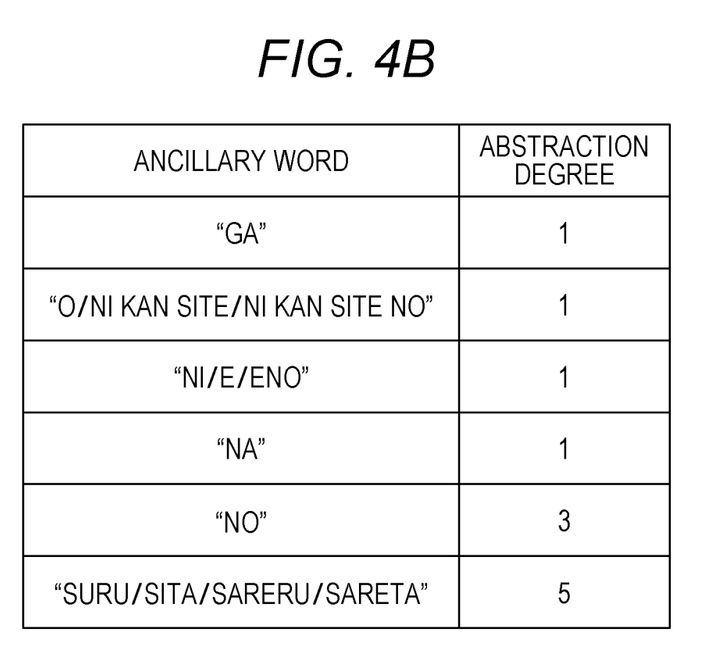

A method of deciding a composite element will be described below with reference to FIGS. 4A, 4B, and 5. FIGS. 4A and 4B are a first explanatory diagram showing a method of deciding a composite element.

The CPU 51 decides a related element having the lowest abstraction degree decided by using the existing merchandise expression and the dependency of each of the plurality of extracted related elements as a composite element to be combined with the feature. The existing merchandise expression is, for example, an expression capable of specifying existing merchandise such as the formal name or abbreviation of the existing merchandise. The existing merchandise expression is an example of a "specific expression capable of specifying the first target object".

The abstraction degree is an index indicating the clarity of expression, and the larger the number, the higher the abstraction degree. In the first embodiment, as an example, the abstraction degree in a related element is decided by totaling abstraction degrees corresponding to the existing merchandise expression and the dependency of the related element.

FIG. 4A is an explanatory diagram for explaining an abstraction degree corresponding to each existing merchandise expression, and FIG. 4B is an explanatory diagram for explaining an abstraction degree corresponding to each ancillary word.

As illustrated in FIG. 4A, for example, two types of existing merchandise expressions, "formal name" and "abbreviation", are provided, the abstraction degree in a case where the existing merchandise expression is "formal name" is "1", and the abstraction degree in a case where the existing merchandise expression is "abbreviation" is "3".

As illustrated in FIG. 4B, for example, six types of ancillary words are provided, namely, "ga", "o/ni kansite/ni kansite no", "ni/e/eno", "na", "no", and "suru/sita/sareru/sareta" (Romaji in Japanese). The symbol "/" in FIG. 4B means "or".

In this case, the abstraction degree is "1" when the ancillary word is "ga", "o/ni kansite/ni kansite no", "ni/e/eno", or "na", the abstraction degree is "3" when the ancillary word is "no", and the abstraction degree is "5" when the ancillary word is "suru/sita/sareru/sareta".

Figure 5:
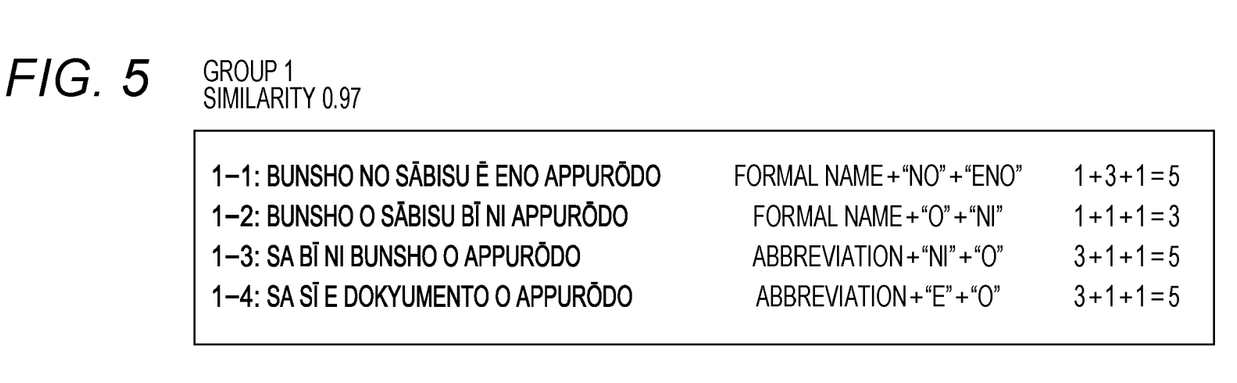
FIG. 5 is a second explanatory diagram illustrating a method of deciding a composite element.

FIG. 5 is a second explanatory diagram showing a method of deciding a composite element.

As illustrated in FIG. 5, the CPU 51 first extracts group 1 having the maximum similarity from the plurality of related elements extracted in step S12 illustrated in FIG. 2. The CPU 51 then decides a related element having the lowest abstraction degree decided by using the existing merchandise expression and the dependency of each related element included in group 1 as a composite element to be combined with the feature.

As an example, in the related element 1-1 illustrated in FIG. 5, since the existing merchandise expression has a formal name of "sābisu ē" (Romaji in Japanese; "service A" in English), the abstraction degree of the existing merchandise expression is "1". Further, in the related element 1-1, since the ancillary words are "no" and "eno", the abstraction degree of the ancillary word "no" is "3", the abstraction degree of the ancillary word "eno" is "1", so the abstraction degree of the dependency is "4". As a result of summing up the abstraction degree of the existing merchandise expression and the abstraction degree of the dependency, as illustrated in FIG. 5, the abstraction degree of the related element 1-1 is "5". In the same manner as described above, abstraction degrees are also decided concerning the related elements 1-2 to 1-4, and the related element 1-2 of "3" having the lowest decided abstraction degree becomes a composite element.

Returning to FIG. 2, in step S14, the CPU 51 combines the feature extracted in step S11 and the composite element decided in step S13 to generate a question about the new merchandise. The process then proceeds to step S15.

Figure 6:
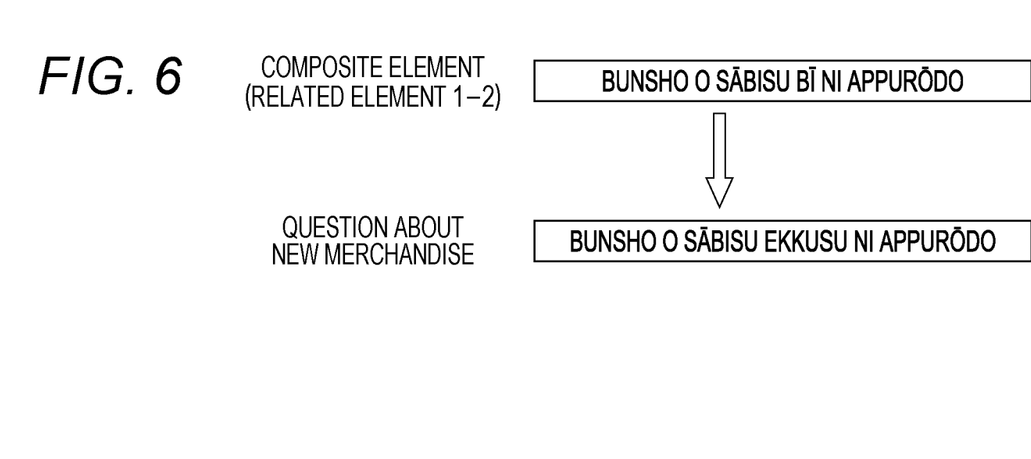
FIG. 6 is an explanatory diagram illustrating a method of generating a question about new merchandise.

FIG. 6 is an explanatory diagram illustrating a method of generating a question about new merchandise.

As illustrated in FIG. 6, as an example, the CPU 51 replaces "sābisu bī" (Romaji in Japanese; "service B" in English) which is the existing merchandise expression in the composite element with "sābisu ekkusu" which is new merchandise expression and generates a question about the new merchandise. Accordingly, a question about the new merchandise, that is, "bunsho o sābisu ekkusu ni appurōdo" (which means "upload document to service X" in English) is generated.

Returning to FIG. 2, in step S15, the CPU 51 stores, in the storage unit 54, Q&A about the new merchandise with the question about the new merchandise generated in step S14 being associated with the "subsection" of the instruction manual describing information serving as an answer to the question used when extracting the feature in step S11. The generation processing is then terminated.

As described above, in the information processing apparatus 50 according to the first embodiment, the CPU 51 extracts a feature of the instruction manual from the instruction manual for the new merchandise. The CPU 51 extracts related elements from Q&A about the existing merchandise stored in the storage unit 54 using the extracted features. The CPU 51 then combines the extracted related elements and features to generate questions about the new merchandise specified in the instruction manual. This enables the information processing apparatus 50 to generate questions about the new merchandise without any manual operation by utilizing the elements included in accumulated Q&A about existing merchandises.

In addition, in the information processing apparatus 50 according to the first embodiment, the CPU 51 extracts, as features, at least a new merchandise expression, an operation expression indicating an operation executable with the new merchandise, and a target expression indicating a target of the operation. This enables the information processing apparatus 50 to generate a question with new merchandise expression being composed from accumulated Q&A about existing merchandise while elements related to operations executable with the new merchandise and targets of the operations are utilized.

In addition, in the information processing apparatus 50 according to the first embodiment, the CPU 51 replaces the existing merchandise expression in the related element with the new merchandise expression to generate a question about the new merchandise. This enables the information processing apparatus 50 to generate a question about the new merchandise while making use of the expression of the related element.

In addition, in the information processing apparatus 50 according to the first embodiment, the CPU 51 extracts a plurality of related elements from Q&A about the existing merchandise. The CPU 51 then decides a related element having the lowest abstraction degree decided by using the existing merchandise expression and the dependency of each related element as a composite element. This enables the information processing apparatus 50 to enhance the clarity of expression in the question about the generated new merchandise compared with the configuration in which the related element having the highest abstraction degree is set as a composition target.

Second Embodiment

The second embodiment will be described while overlapping portions with other embodiments will be omitted or simplified.

An information processing apparatus 50 according to the second embodiment is partially different from the first embodiment in a method of generating a question about new merchandise. The method of generating a question about new merchandise according to the second embodiment can be implemented by, for example, using the method described in Yoshihiro Ueda, Mamiko Oka, Takahiro Koyama, and Tadanobu Miyauchi, "Summarization System Based on Phrase Expression Summarization Means", Journal of the 5th Annual Meeting of The Association for Natural Language Processing, Mar. 16, 1999, pp. 361-364.

Figure 7:
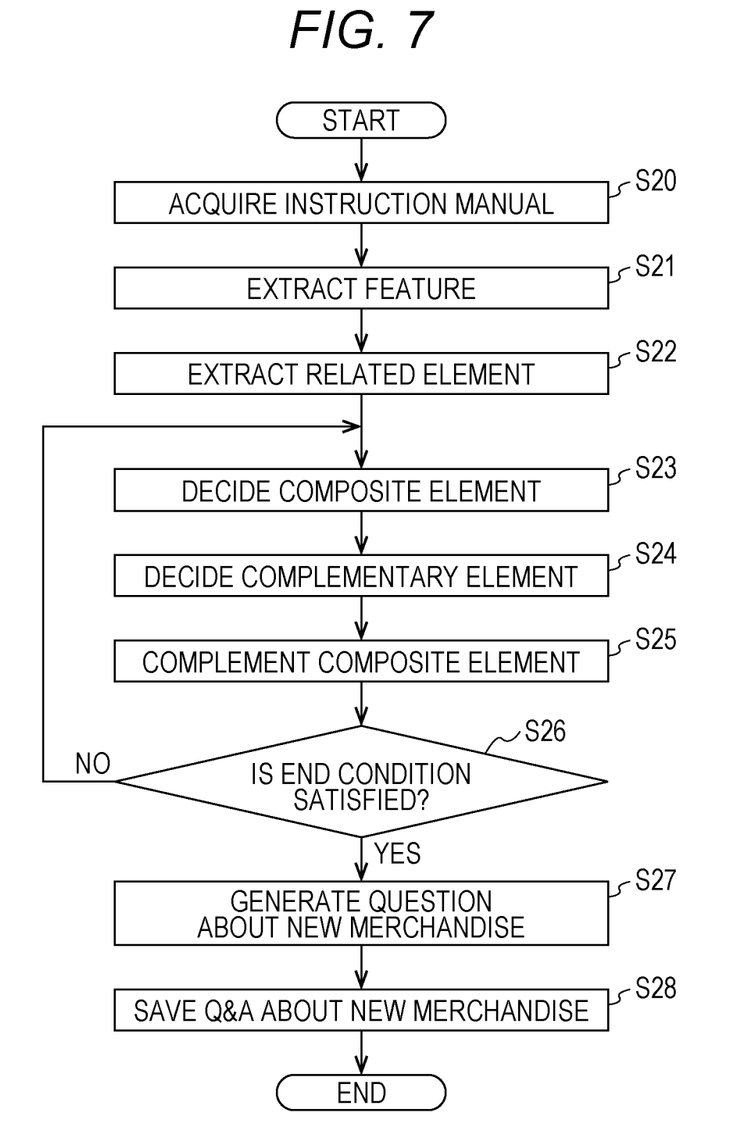
FIG. 7 is a second flowchart illustrating the procedure of generation processing by the information processing apparatus.

FIG. 7 is a second flowchart illustrating the procedure of generation processing by the information processing apparatus 50. Since the processing from step S20 to step S23 shown in FIG. 7 is the same as the processing from step S10 to step S13 shown in FIG. 2, a description thereof will be omitted.

In step S24 illustrated in FIG. 7, the CPU 51 decides a complementary element including a complementary expression that complements the expression of the composite element decided in step S23 from the plurality of related elements extracted in step S22. The process then proceeds to step S25.

In step S25, the CPU 51 generates a complemented expression obtained by complementing the expression of the composite element with the complementary expression included in the complementary element decided in step S24. The process then proceeds to step S26. A method of generating a complemented expression will be described later.

In step S26, the CPU 51 determines whether or not a predetermined end condition is satisfied. Upon determining that the end condition is satisfied (step S26: YES), the process proceeds to step S27. On the other hand, if the CPU 51 determines that the end condition is not satisfied (step S26: NO), the process returns to step S23. Note that the above-described end condition is not limited, and any condition can be set. In a case where the process returns from step S26 to step S23, a complemented expression different from the previous complemented expression is generated in next step S25.

In step S27, the CPU 51 combines the features extracted in step S21 and the complemented expression generated in step S25 to generate a question about the new merchandise. The process then proceeds to step S28.

In step S28, the CPU 51 stores, in the storage unit 54, Q&A about the new product with the question about the new product generated in step S27 being associated with the "subsection" of the instruction manual describing information serving as an answer to the question used when extracting the feature in step S21. The generation processing is then terminated.

Figure 8:
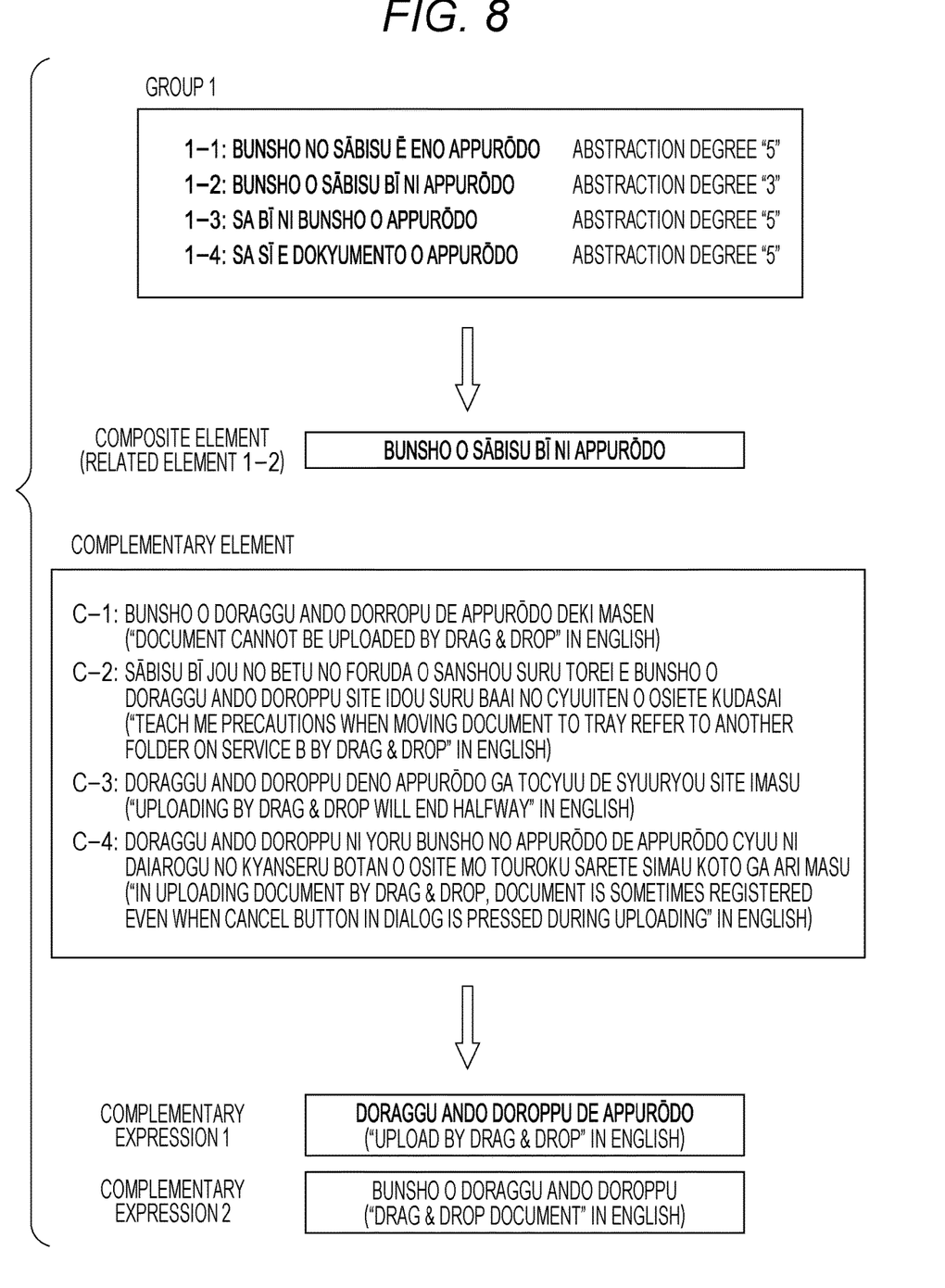
FIG. 8 is a first explanatory diagram for explaining a procedure of generating a question about new merchandise.

A specific example of a procedure of generating a question about new merchandise in the second embodiment will be described below with reference to FIGS. 8 and 9. FIG. 8 is a first explanatory diagram for explaining a procedure of generating a question about new merchandise.

As illustrated in FIG. 8, for example, in step S23 illustrated in FIG. 7, the CPU 51 decides the related element 1-2 having the lowest abstraction degree in group 1 having the highest similarity among the plurality of related elements extracted in step S22 as a composite element. In addition, for example, in step S24, the CPU 51 extracts complementary elements C-1 to C-4 as a plurality of complementary elements from the plurality of related elements extracted in step S22. The CPU 51 extracts, from the complementary elements C-1 to C-4, a complementary expression including at least one of "doraggu ando doroppu" (Romaji in Japanese; "drag & drop" in English) which is means for executing uploading indicated by the expression of the composite element or "bunsho" which is a target to be uploaded. As illustrated in FIG. 8, for example, the CPU 51 extracts complementary expression 1 including means for executing uploading and complementary expression 2 including a target to be uploaded. Any known technology can be adopted as a method of extracting complementary expressions by the CPU 51.

Figure 9:
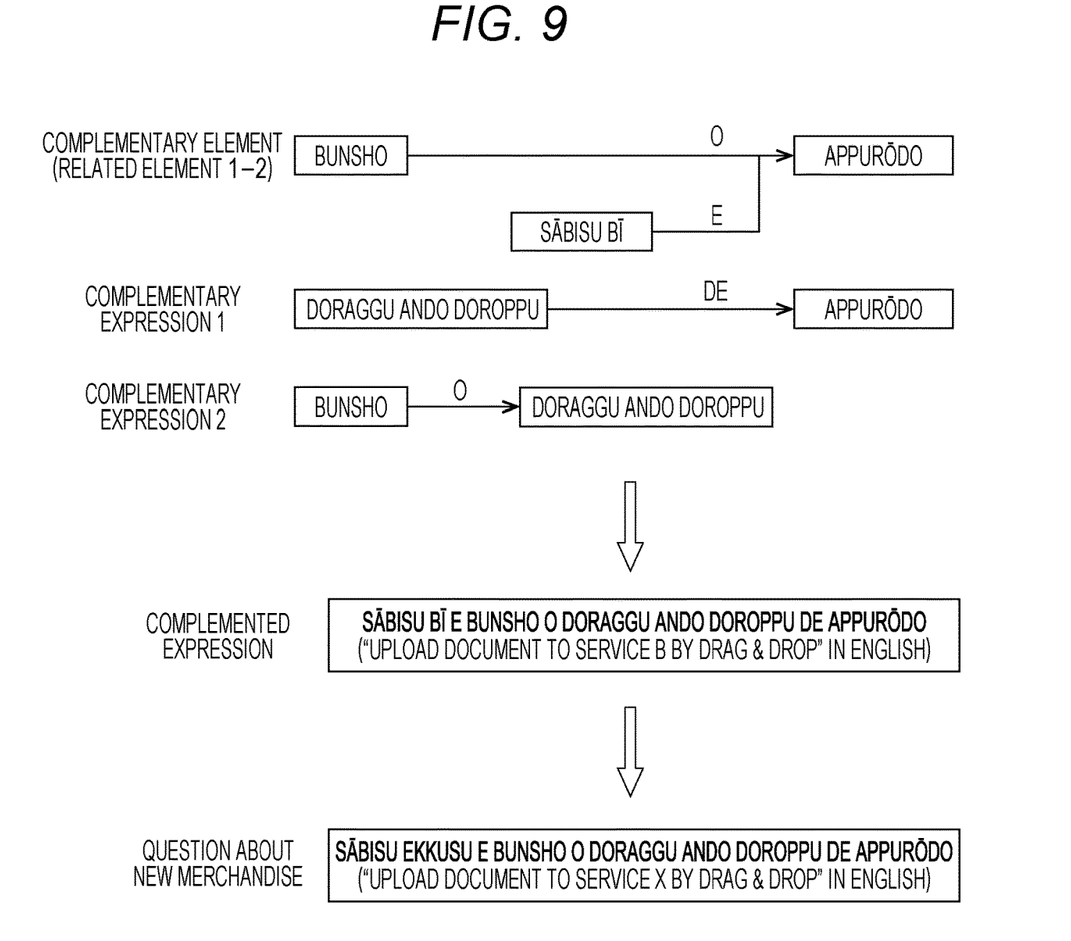
FIG. 9 is a second explanatory diagram for explaining a procedure of generating a question about new merchandise.

FIG. 9 is a second explanatory diagram illustrating a specific example of a question about new merchandise.

As illustrated in FIG. 9, in step S25 illustrated in FIG. 7, the CPU 51 performs morphological analysis on each of the complementary expressions included in the composite elements decided in step S23 and the complementary elements decided in step S24 and divides the result of the morphological analysis into an independent word and an ancillary word. More specifically, the composite elements are divided into the independent word "bunsho" and its ancillary word "o", the independent word "sābisu bī" and its ancillary word "e", and the independent word "appurōdo". Complementary expression 1 is divided into the independent word "doraggu ando doroppu" and its ancillary word "de" and the independent word "appurōdo". Complementary expression 2 is divided into the independent word "bunsho" and its ancillary word "o", and the independent word "doraggu ando doroppu".

The CPU 51 generates a complemented expression by combining the divided composite elements and the complementary expression so as to complement the expression of the composite elements. As illustrated in FIG. 9, for example, the CPU 51 generates the complemented expression "sābisu bī e bunsho o doraggu ando doroppu de appurōdo" (which means "upload document to service B by drag & drop" in English). The word order of the complemented expression is an example, and a word order different from the word order described above may be used, or a plurality of complemented expressions different in word order may be generated.

In step S27 illustrated in FIG. 7, the CPU 51 replaces "sābisu bī" which is an existing merchandise expression in the complemented expression with "sābisu ekkusu" which is a new merchandise expression and generates a question about the new merchandise. As a result, a question about the new merchandise, that is, "sābisu ekkusu e bunsho o doraggu ando doroppu de appurōdo" (which means "upload document to service X by drag & drop" in English) is generated. In a case where a plurality of complemented expressions are generated, questions about a plurality of pieces of new merchandise are generated.

As described above, in the information processing apparatus 50 according to the second embodiment, the CPU 51 extracts at least one complementary element including a complementary expression that complements the expression of a composite element from the plurality of related elements. The CPU 51 then combines the new merchandise expression with the complemented expression obtained by complementing the expression of the composite element with the complementary expression included in the complementary element and generates a question about the new merchandise. This enables the information processing apparatus 50 to generate questions about the new merchandise by complementing the elements included in accumulated Q&A about existing merchandises.

In addition, in the information processing apparatus 50 according to the second embodiment, a complementary expression includes at least one of means for executing an operation that can be executed with the existing merchandise indicated by the expression of a composite element and a target of the operation. This enables the information processing apparatus 50 to complement the elements included in accumulated Q&A about the existing merchandise with at least one of means for executing the operation executable with the existing merchandise and the target of the operation.

(Others)

Although the storage unit 54 of the information processing apparatus 50 is an example of a "storage unit" in the above-described embodiment, the present invention is not limited thereto, and a storage device, a cloud storage, or the like included in an apparatus different from the information processing apparatus 50 may be an example of a "storage unit".

While Q&A is an example of the "questions and answers" in the embodiment described above, the present invention is not limited thereto, and frequently asked questions (FAQ) may be an example of "questions and answers".

In the above-described embodiment, the instruction manual is an example of a "document", but the present invention is not limited thereto, and a company rule, a work procedure manual, or the like may be an example of a "document".

In the above-described embodiment, the features of the instruction manual are extracted from "chapter", "section", and "subsection" of the instruction manual. However, the present invention is not limited thereto, and the features of "subsection" may be extracted from "subsection" in which information serving as an answer to a question about the new merchandise to be generated is described as a part of the instruction manual.

In the above-described embodiment, the characters of a new merchandise expression, an operation expression, and a target expression are extracted as features, but in addition to this, an image may be extracted as a feature, and related elements may be extracted from Q&A about the existing merchandise using the extracted image.

In each of the above-described embodiments, the processor refers to a processor in a broad sense and includes a general-purpose processor (for example, CPU: Central Processing Unit or the like) and a dedicated processor (for example, GPU: Graphics Processing Unit, ASIC: Application Specific Integrated Circuit, FPGA: Field Programmable Gate Array, programmable logic devices, or the like).

The operation of the processor in each of the above-described embodiments may be performed not only by one processor but also by a plurality of physically separated processors cooperating with each other. In addition, the order of the respective operations of the processor is not limited to the order described in each embodiment described above and may be appropriately changed.

What is claimed is:

1. An information processing apparatus; comprising a processor, configured to:
   acquire a document for a new target merchandise, wherein the document is a structured document composed of a plurality of parts comprising a designated part that describes information serving as an answer to a question about the new target merchandise;
   extract a feature of the document from the designated part;
   extract a plurality of related elements from a question and an answer about an existing target merchandise from an existing document stored in a memory using the extracted feature;
   determine a related element, among the plurality of related elements, having a lowest abstraction degree by using a specific expression capable of specifying the existing target merchandise and a dependency of each of the plurality of related elements as a composite element, wherein an abstraction degree is an index indicating a clarity of an expression, and wherein the larger the number, the higher the abstraction degree;
   combine the composite element and the extracted feature to generate a question about the new target merchandise; and
   store the generated question about the new target merchandise along with the answer about the new target merchandise in the designated part of the document to generate a new document for the new target merchandise.

2. The information processing apparatus according to claim 1,
   wherein the processor extracts, as the feature, at least a specific expression capable of specifying the new target merchandise, an operation expression indicating an operation executable with the new target merchandise and a target expression indicating a target of the operation.

3. The information processing apparatus according to claim 2,
   wherein the processor generates the question about the new target merchandise by replacing a specific expression capable of specifying the existing target merchandise in the related element with the specific expression capable of specifying the new target merchandise.

4. The information processing apparatus according to claim 1,
   wherein the processor extracts a plurality of the related element from the question and the answer about the existing target merchandise and decides the related element having a lowest abstraction degree decided using a specific expression capable of specifying the existing target merchandise and a dependency of each of the related elements as a composite element to be combined with the feature.

5. The information processing apparatus according to claim 4,
   wherein the processor extracts at least one complementary element including a complementary expression that complements an expression of the composite element from the plurality of related elements, combines a specific expression capable of specifying the new target merchandise with a complemented expression obtained by complementing the expression of the composite element with the complementary expression included in the complementary element, and generates the question about the new target merchandise.

6. The information processing apparatus according to claim 5,
   wherein the complementary expression includes at least one of a manner to execute an operation executable with the existing target merchandise represented by the expression of the composite element and a target of the operation.

7. A non-transitory computer readable recording medium recording an information processing program causing a computer to:
   acquire a document for a new target merchandise, wherein the document is a structured document composed of a plurality of parts comprising a designated part that describes information serving as an answer to a question about the new target merchandise;
   extract a feature of the document from the designated part;
   extract a plurality of related elements from a question and an answer about an existing target merchandise from an existing document stored in a memory using the extracted feature;
   determine a related element, among the plurality of related elements, having a lowest abstraction degree by using a specific expression capable of specifying the existing target merchandise and a dependency of each of the plurality of related elements as a composite element, wherein an abstraction degree is an index indicating a clarity of an expression, and wherein the larger the number, the higher the abstraction degree;
   combine the composite element and the extracted feature to generate a question about the new target merchandise; and store the generated question about the new target merchandise along with the answer about the new target merchandise in the designated part of the document to generate a new document for the new target merchandise.

8. The information processing apparatus according to claim 1,
wherein the new target merchandise and the existing target merchandise are merchandises of a same type.

9. The information processing apparatus according to claim 1,
wherein the new target merchandise is a new version of the existing target merchandise.

* * * * *